(12) United States Patent
Meltzer

(10) Patent No.: US 8,637,629 B2
(45) Date of Patent: Jan. 28, 2014

(54) HIGH MOISTURE VAPOR TRANSMISSIVE POLYURETHANES

(75) Inventor: Donald A. Meltzer, Akron, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 13/223,338

(22) Filed: Sep. 1, 2011

(65) Prior Publication Data
US 2011/0312237 A1  Dec. 22, 2011

Related U.S. Application Data

(63) Continuation-in-part of application No. 11/624,231, filed on Jan. 18, 2007, now abandoned.

(51) Int. Cl.
*C08G 18/00* (2006.01)

(52) U.S. Cl.
USPC ............... 528/76; 528/59; 528/61; 528/63; 528/64; 528/65; 528/66; 528/85

(58) Field of Classification Search
USPC ............ 528/59, 76, 65, 85, 61, 63, 64, 66
See application file for complete search history.

(56) References Cited

U.S. PATENT DOCUMENTS

| | | | |
|---|---|---|---|
| 2,674,619 A | 4/1954 | Lundsted | |
| 4,202,957 A * | 5/1980 | Bonk et al. | 528/77 |
| 4,359,558 A | 11/1982 | Gould et al. | |
| 4,696,954 A * | 9/1987 | Pritchard et al. | 521/167 |
| 5,049,638 A | 9/1991 | Matsumoto et al. | |
| 5,061,254 A | 10/1991 | Karakelle et al. | |
| 5,428,123 A * | 6/1995 | Ward et al. | 528/28 |
| 5,993,972 A * | 11/1999 | Reich et al. | 428/423.1 |
| 6,613,867 B2 | 9/2003 | Sonnenschein et al. | |
| 6,984,709 B2 | 1/2006 | Meltzer et al. | |
| 8,361,272 B2 * | 1/2013 | Tuominen et al. | 156/331.7 |

FOREIGN PATENT DOCUMENTS

| | | |
|---|---|---|
| EP | 0404517 A1 | 12/1990 |
| EP | 1236757 A1 | 9/2002 |
| JP | 60135421 A | 7/1985 |
| WO | 88/00214 A1 | 1/1988 |
| WO | 00/23492 A1 | 4/2000 |
| WO | 2004/044028 A1 | 5/2004 |
| WO | 2006/064085 A2 | 6/2006 |

* cited by examiner

*Primary Examiner* — Michael L Leonard
(74) *Attorney, Agent, or Firm* — Thomas T. Dunlap

(57) ABSTRACT

The present invention relates generally to polyurethane compositions; and more preferably to thermoplastic polyurethane compositions. In one embodiment, the polyurethane compositions of the present invention have high moisture vapor transmission rates and are suitable for film applications (e.g., breathable films). In one embodiment, the polyurethane compositions of the present invention are prepared from the reaction of a mixed polyol component, a polyisocyanate component, a chain extender, and optionally at least one suitable catalyst, wherein the mixed polyol component is formed by a combination of one or more poly(ethylene oxide) polyols and one or more copolymer polyols, where the resulting mixed polyol component comprises from about 3 to about 30 weight percent of a copolymer polyol and about 70 to 97 weight percent of poly(ethylene oxide) polyol.

7 Claims, No Drawings

HIGH MOISTURE VAPOR TRANSMISSIVE POLYURETHANES

CROSS REFERENCE TO RELATED APPLICATION

This application is a continuation-in-part of U.S. patent application Ser. No. 11/624,231 filed on Jan. 18, 2007.

FIELD OF THE INVENTION

The present invention relates generally to polyurethane compositions; and more preferably to thermoplastic polyurethane compositions. In one embodiment, the polyurethane compositions of the present invention have high moisture vapor transmission rates and are suitable for film applications (e.g., breathable films). In one embodiment, the polyurethane compositions of the present invention are prepared from the reaction of a mixed polyol component, a polyisocyanate component, a chain extender, and optionally at least one suitable catalyst, wherein the mixed polyol component is formed from a combination of one or more poly(ethylene oxide) polyols and one or more co-polymer polyols. The co-polymer polyol is a co-polymer of ethylene oxide and a $C_3$ to $C_{15}$ alkylene oxide, preferably a $C_3$ to $C_6$ alkylene oxide. The mixed polyol component comprises from about 70 to about 97 weight percent of poly(ethylene oxide) and from about 3 to about 30 weight percent of the co-polymer polyol.

BACKGROUND OF THE INVENTION

Thermoplastic polyurethanes are usually produced by reacting a polyol compound with a diisocyanate and a chain extender and have linear polymeric molecular structures having hard segment portions and soft segment portions. Thermoplastic polyurethanes formed in accordance with this general recipe have various properties including a wide variety of moisture vapor transmission (MVT) rates.

U.S. Pat. No. 6,613,867 relates to thermoplastic polyurethanes (TPUs) or thermoplastic polyurethane/ureas (TPUUs) that comprise structural units of: a) a diisocyanate; b) ethylene glycol, diethylene glycol, or 1,3-propanediol; c) a diol, a diamine, or an amino alcohol different from the one selected in (b) and having a molecular weight of less than 400 Daltons; and (d) ethylene oxide polyol or ethylene oxide-capped propylene oxide polyol.

U.S. Pat. No. 6,984,709 relates to breathable thermoplastic polyurethanes that are prepared from the reaction of a polyol component, a polyisocyanate component, and a chain extender in the presence of a metal-free catalyst. The metal-free catalyst is disclosed as a polyalcohol amine, a tertiary amine catalyst, or a combination thereof.

It is a long accepted believe in the art that thermoplastic polyurethane polymers made from poly(ethylene oxide) polyols give the highest moisture vapor transmission rates. It would be beneficial to improve (increase) the moisture vapor transmission of a poly(ethylene oxide) based thermoplastic polyurethane polymer.

SUMMARY OF THE INVENTION

The present invention relates generally to polyurethane compositions; and more preferably to thermoplastic polyurethane compositions. In one embodiment, the polyurethane compositions of the present invention have high moisture vapor transmission rates and are suitable for film applications (e.g., breathable films). In one embodiment, the polyurethane compositions of the present invention are prepared from the reaction of a mixed polyol component, a polyisocyanate component, a chain extender, and optionally at least one suitable catalyst, wherein the mixed polyol component is formed from a combination of one or more poly(ethylene oxide) polyols and one or more copolymer polyols. The copolymer polyol is a copolymer of ethylene oxide and a $C_3$ to $C_{15}$ alkylene oxides, preferably a $C_3$ to $C_6$ alkylene oxide. The mixed polyol component comprises from about 70 to about 97 weight percent of poly(ethylene oxide), and from about 3 to about 30 weight percent of the copolymer polyol.

In one embodiment, the present invention relates to a thermoplastic polyurethane composition comprising: the reaction product of: (a) a mixed polyol component, the mixed polyol component comprising at least one poly(ethylene oxide) polyol and at least one copolymer polyol; (b) at least one polyisocyanate; (c) at least one chain extender; and (d) optionally at least one catalyst, wherein the mixed polyol component comprises from about 5 weight percent to about 20 weight percent of one or more copolymer polyols.

In another embodiment, the present invention relates to a thermoplastic polyurethane composition comprising: the reaction product of: (a) a mixed polyol component, the mixed polyol component comprising at least one poly(ethylene oxide) polyol and at least one copolymer polyol; (b) at least one polyisocyanate; (c) at least one chain extender; and (d) optionally at least one catalyst, wherein the mixed polyol component comprises from about 5 weight percent to about 15 weight percent of one or more copolymer polyols.

In still another embodiment, the present invention relates to an article comprising: a breathable polyurethane layer; and a substrate layer attached to the breathable polyurethane layer, wherein the substrate layer comprises a woven or non-woven material and the breathable polyurethane layer comprises the reaction product of: (a) a mixed polyol component, the mixed polyol component comprising at least one poly(ethylene oxide) polyol and at least one copolymer polyol; (b) at least one polyisocyanate; (c) at least one chain extender; and (d) optionally at least one catalyst, wherein the mixed polyol component comprises from about 3 weight percent to about 30 weight percent of one or more copolymer polyol.

DETAILED DESCRIPTION OF THE INVENTION

The present invention relates generally to polyurethane compositions; and more preferably to thermoplastic polyurethane compositions. In one embodiment, the polyurethane compositions of the present invention have high moisture vapor transmission rates and are suitable for film applications (e.g., breathable films). In one embodiment, the polyurethane compositions of the present invention are prepared from the reaction of a mixed polyol component, a polyisocyanate component, a chain extender, and optionally at least one suitable catalyst, wherein the mixed polyol component is formed from a combination of one or more poly(ethylene oxide) polyols and one or more copolymer polyols, where the resulting mixed polyol component comprises from about 3 to about 30 weight percent of the copolymer polyol. In another embodiment, the resulting mixed polyol component comprises from about 5 to about 20 weight percent of the copolymer polyol and said copolymer polyol is a copolymer of ethylene oxide and a $C_3$ to $C_6$ alkylene oxide.

In one embodiment, the polyurethane compositions of the present invention can be utilized to prepare breathable films and/or materials. Such breathable TPU films and/or materials allow perspiration to evaporate. In the one instance, the polyurethane sheets of the present invention are apertureless and free or substantially free of punctures or porosity so as to prevent water from penetrating the garment. The polyurethane sheets and films are breathable and have a high affinity for water due to the built-in ethylene oxide units in their backbones from the mixed polyol component. This high affinity attracts water that is absorbed by the film. Subsequently, the water diffuses through the film, due to osmotic pressure, to the side of the film where the vapor pressure is lower. Thus, the sheets or films selectively allow water to pass there through, but do not allow bulk passage of water. Although not limited thereto, the polyurethane compositions of the present invention can be formed into breathable films for use as, for example, roofing membranes and house wrap applications, as well as in apparel.

Furthermore, films formed from the TPUs of the present invention unexpectedly have higher moisture vapor transmission (MVT) rates when compared to a similar TPU film formed from similar TPU reactants that do not utilize the present invention's mixed polyol component. More specifically, the films formed from the TPUs of the present invention are found to have higher MVTs even though the mixed polyol component of the present invention is formed from a combination of one or more poly(ethylene oxide) polyols and one or more copolymer polyols, where the resulting mixed polyol component comprises from about 3 weight percent to about 30 weight percent of said copolymer polyol, preferably from about 5 to about 20, and more preferably from about 5 to about 15 weight percent. The copolymer polyol is a copolymer of ethylene oxide and a $C_3$ to $C_{15}$ alkylene oxides, preferably a $C_3$ to $C_6$ alkylene oxides, and more preferably propylene oxide.

In one embodiment, the polyurethane compositions as described herein can be prepared by numerous methods known in the art. In one embodiment, a one-shot polymerization process is utilized where all of the reactants are combined simultaneously or substantially simultaneously and reacted. In one instance, such a one-shot process can be performed in an extruder. In another embodiment, the TPUs of the present invention can be polymerized in a variety of step-wise addition processes (e.g., a random melt polymerization process as is described below). In some embodiments, the resulting polyurethane compositions can be further processed to form desired articles and/or products.

The term "polyurethane composition" when utilized throughout the specification can refer to a composition containing the necessary reagents utilized to form a polyurethane, or a composition subsequent to reaction of polyurethane forming reagents by some process or mechanism. As is noted above, the thermoplastic polyurethane polymers of the present invention comprise the reaction product of a mixed polyol component, a polyisocyanate component, a chain extender, and optionally at least one suitable catalyst. In another embodiment, the present invention relates to polyurethane compositions having improved moisture vapor transmission (MVT) rates that are prepared from the reaction of a mixed polyol component, a polyisocyanate component, a chain extender, and optionally at least one suitable catalyst, wherein the mixed polyol component is formed from a combination of one or more poly(ethylene oxide) polyols and one or more copolymer polyols.

Polyols:

As noted above, the thermoplastic polyurethanes of the present invention are the reaction product of a mixed polyol component. By "mixed polyol component" it is meant that the mixed polyol component is formed from the combination of one or more poly(ethylene oxide) polyols and one or more copolymer polyols, where the resulting mixed polyol component comprises from about 3 weight percent to about 30 weight percent of said copolymer polyol, preferably from about 5 to about 20, and more preferably from about 5 to about 15 weight percent. The copolymer polyol is a copolymer of ethylene oxide and one or more $C_3$ to $C_{15}$ alkylene oxides, preferably one or more $C_3$ to $C_6$ alkylene oxides, and more preferably propylene oxide. The weight percent referred to herein is the weight percent based on the total weight of all polyols, such as the combined weight of the poly(ethylene oxide) polyol and the copolymer polyol. Here, as well as elsewhere in the specification and claims, individual range limits can be combined to form additional range limits.

Suitable copolymer polyols for use in the present invention include, but are not limited to, copolymers of ethylene oxide and propylene oxide that include less than about 75 mole percent ethylene oxide, or less than about 70 mole percent ethylene oxide, or less than about 65 mole percent ethylene oxide, or less than about 60 mole percent ethylene oxide, or less than about 55 mole percent ethylene oxide, or less than about 50 mole percent ethylene oxide, or less than about 45 mole percent ethylene oxide, or less than about 40 mole percent ethylene oxide, or less than about 35 mole percent ethylene oxide, or less than about 30 mole percent ethylene oxide, or less than about 25 mole percent ethylene oxide, or even less than about 20 mole percent ethylene oxide, where at least about 50 percent of the end groups of such polymers are primary OH groups. In another embodiment, at least about 55 percent of the end groups of such polymers are primary OH groups, or at least about 60 percent of the end groups of such polymers are primary OH groups, or even at least about 65 percent of the end groups of such polymers are primary OH groups.

In one embodiment, suitable alkylene oxides for use in the copolymer polyols of the mixed polyol component of the present invention can be a diol or polyol having from 3 to about 15 carbon atoms, from 3 to about 10 carbon atoms, or even from 3 to about 6 carbon atoms. Examples of preferred alkylene oxides include, but are not limited to, propylene oxide, and butylene oxide or combinations thereof. As would be apparent to those of skill in the art, methods by which to form the polyols suitable for use in the present invention are well-known. Accordingly, a detailed discussion of such processes is omitted herein for the sake of brevity.

The overall number average molecular weight of the one or more copolymer polyols of the mixed polyol component of the present invention is in the range of from about 500 to about 10,000 Daltons, or from about 750 to about 5,000, or from about 1,000 to about 4,000, or even from about 1,300 to about 3,300. By "overall number average molecular weight" it is meant that the numerical average of the copolymer polyol component of the mixed polyol component is calculated based on the different molecular weights and proportions of the one or more copolymer polyols contained therein. As such, copolymer polyols having number average molecular weight outside the above ranges could be utilized in the present invention so long as the overall number average molecular weight of a mixed copolymer polyol component falls within one or more of the above ranges.

Suitable poly(ethylene oxide) polyols for the mixed polyol component include, but are not limited to, single or mixed poly(ethylene oxide) polyols that have overall number average molecular weights in the range of about 500 to about 10,000 Daltons, or about 750 to about 5,000, or about 1,000 to about 4,000, or even about 1,500 to about 3,300. By "overall number average molecular weight" it is meant that the numerical average of the poly(ethylene oxide) component of the mixed polyol component is calculated based on the different molecular weights and proportions of the one or more poly(ethylene oxide) polyols contained therein. As such, poly(ethylene oxide) polyols having number average molecular weight outside the above ranges could be utilized in the present invention so long as the overall number average molecular weight of a mixed poly(ethylene oxide) polyol component falls within one or more of the above ranges.

In another embodiment, blends of one or more poly(ethylene oxide) polyols can be utilized in the present invention. In another embodiment, the poly(ethylene oxide) polyol portion of the mixed polyol component is selected from a single polyethylene glycol.

Suitable polyols for use in the present invention are commercially available from Bayer Corporation as Arcol®, Acclaim® or Multranol®; and Arch as Poly G®.

Polyisocyanates:

The polyurethane polymers of the present invention are formed from a polyurethane composition containing an isocyanate component. In order to form relatively long linear polyurethane chains, di-functional or polyfunctional isocyanates are utilized. In one embodiment, one or more diisocyanates are utilized. Suitable polyisocyanates are commercially available from companies such as, but not limited to, Bayer Corporation of Pittsburgh, Pa., The BASF Corporation of Parsippany, N.J., The Dow Chemical Company of Midland, Mich., and Huntsman Chemical of Utah. The polyisocyanates of the present invention generally have a formula $R(NCO)_n$, where n is 2. R can be an aromatic, a cycloaliphatic, an aliphatic, or combinations thereof having from 2 to about 20 carbon atoms. Examples of polyisocyanates include, but are not limited to, diphenylmethane-4,4'-diisocyanate (MDI), toluene-2,4-diisocyanate (TDI), toluene-2,6-diisocyanate (TDI), methylene bis(4-cyclohexylisocyanate ($H_{12}$MDI), 3-isocyanatomethyl-3,5,5-trimethyl-cyclohexyl isocyanate (IPDI), 1,6-hexane diisocyanate (HDI), naphthalene-1,5-diisocyanate (NDI), 1,3- and 1,4-phenylenediisocyanate, triphenylmethane-4,4', 4"-triisocyanate, polyphenylpolymethylenepolyisocyanate (PMDI), m-xylene diisocyanate (XDI), 1,4-cyclohexyl diisocyanate (CHDI), isophorone diisocyanate, isomers, dimers, trimers and mixtures or combinations of two or more thereof. In one embodiment, the isocyanates utilized in the present invention are diphenylmethane-4,4'-diisocyanate (MDI) and $H_{12}$MDI which produce polyurethanes with superior UV resistance.

Chain Extenders:

Chain extenders are employed in the polyurethane forming compositions of the present invention generally to increase the molecular weight thereof, and are well known to the art and to the literature. Suitable chain extenders include, but are not limited to, organic diols or glycols having a total of from 2 to about 20 carbon atoms such as alkane diols, cycloaliphatic diols, alkylaryl diols, and the like. Alkane diols which have a total from about 2 to about 6 carbon atoms are often utilized with examples including, but not limited to, ethanediol, propane glycol, 1,6-hexanediol, 1,3-butanediol, 1,5-pentanediol, neopentylglycol, and 1,4-butanediol (1,4-BDO). Dialkylene ether glycols can also be utilized such as diethylene glycol and dipropylene glycol. Examples of suitable cycloaliphatic diols include, but are not limited to, 1,2-cyclopentanediol, 1,4-cyclohexanedimethanol (CHDM) and the like. Examples of suitable alkylaryl diols include, but are not limited to, hydroquinone di(β-hydroxyethyl)ether (HQEE), 1,4-benzenedimethanol, bisethoxy biphenol, bisphenol A ethoxylates, bisphenol F ethoxylates and the like. Still other suitable chain extenders are 1,3-di(2-hydroxyethyl)benzene, and 1,2-di(2-hydroxyethoxy)benzene. Mixtures of one or more of the above chain extenders can also be utilized.

In one embodiment, the chain extender utilized in the present invention is selected from 1,4-butanediol, ethylene glycol, diethylene glycol, 1,6-hexane diol, 1,4-cyclohexanedimethanol (CHDM), hydroquinone di(β-hydroxyethyl)ether (HQEE), and 1,4-benzenedimethylol.

Chain extenders with functionality greater than 2 may also be used so long as the resulting TPU retains its thermoplasticity. Examples of such chain extenders include, but are not limited to, trimethyolpropane (TMP), glycerin and pentraerythritol. Generally, the addition of such chain extenders should not exceed 10% relative to the weight of the difunctional chain extenders.

The molar amount or ratio of the total hydroxyl groups of the one or more chain extenders utilized to the total hydroxyl groups of the mixed polyol component set forth above is generally from about 0.1 to about 5.0, or from about 0.2 to about 4.0, or even from about 0.4 to about 2.5.

Catalysts:

As is noted above, the thermoplastic polyurethanes (TPUs) of the present invention optionally utilize one or more catalysts. Suitable catalysts for forming the TPUs of the present invention include, but are not limited to, organic tin compounds such as dibutyltin diacetate, dibutyltin dilaurate (DBTL), dioctyltin dilaurate (DOTDL) and dibutyltin bis (ethoxybutyl 3-mercaptopropionate); titanic acid; organic titanium compounds such as tetraisopropyl titanate, tetra-n-butyl titanate, polyhydroxytitanium stearate and titanium acetylacetonate; tertiary amines such as triethylene diamine, N-methylmorpholine, N,N,N',N'-tetramethylethylenediamine, N,N,N',N'-tetramethylhexa-methylene diamine, triethylamine and N,N-dimethylaminoethanol; and mixtures of two or more thereof.

In still another embodiment, a non-organometallic catalyst can be utilized in the present invention. Such catalysts include, but are not limited to, a polyalcohol amine catalyst, a tertiary amine catalyst, or a combination thereof as is disclosed in U.S. Pat. No. 6,984,709, which is hereby incorporated by reference with regard to its teachings of catalysts for use in the formation of TPUs.

Polymerization Process and Additional Additives:

As is noted above, the thermoplastic polyurethanes (TPUs) of the present invention are formed from the reaction of (1) a mixed polyol component; (2) one or more polyisocyanates; (3) one or more chain extenders, and (4) optionally one or more suitable catalysts. Numerous methods of forming polyurethane are known including the multi-step process of reacting the mixed polyol component with the polyisocyanate component and then chain extending the same.

The thermoplastic polyurethanes of the present invention are, in one embodiment, produced by the "one-shot" polymerization process as known in the art, wherein the mixed polyol component, polyisocyanate component, the chain extender, and optionally at least one catalyst are added together, mixed, and polymerized. Desirably, the mixed polyol component, the chain extender, and the at least one optional catalyst are added in one stream and the polyisocyanate is added in a second stream. In one instance, the one-shot polymerization process is performed in an extruder. The monomers are supplied for the polymerization reaction and the reaction is performed at a temperature in the range of about 60° C. to about 220° C., or from about 100° C. to about 210° C., and even from about 120° C. to about 200° C. Suitable mixing times to enable the various components to react and form the thermoplastic polyurethanes of the present invention are, in one embodiment, from about 1 minute to about 10 minutes, or from about 2 minutes to about 7 minutes, or even from about 3 minutes to about 5 minutes.

The molar ratio of polyisocyanate functional groups to total hydroxyl groups of the mixed polyol component and chain extender is, in one embodiment, from about 0.95 to about 1.10, or even from about 0.98 to about 1.05.

The weight average molecular weight of the polymerized thermoplastic polyurethanes of the present invention generally range from about 50,000 to about 1,000,000 Daltons, or from about 75,000 to about 500,000, or even from about 100,000 to about 300,000. The polyurethanes of the present invention have a hardness of about 98 Shore A or less.

In addition to the above-identified components, the TPU compositions of the present invention can also optionally contain various additives, pigments, dyes, fillers, lubricants, UV absorbers, waxes, antioxidants, thickening agents and the like, which can be utilized in conventional amounts as known to those of skill in art or in the literature. The additives utilized generally impart desired properties to the thermoplastic polyurethanes. Fillers include talc, silicates, clays, calcium carbonate, and the like.

If it is desired that the polyurethane compositions of the present invention have a color or hue, any conventional pigment or dye can be utilized in conventional amounts. Hence, any pigment known to those of skill in the art, or in the literature, can be utilized as for example titanium dioxide, iron oxide, carbon black, and the like, as well as various dyes provided that they do not interfere with the various urethane reactions.

The thermoplastic polyurethanes (TPUs) of the present invention can be extruded into any desired end product or form, or can be cooled and pelletized or granulated for storage or bulk shipping. The extrudate can be immediately processed in some other manner after extrusion to give a desired final end use product.

The thermoplastic polyurethanes of the present invention advantageously are suitable for many applications, including, but not limited to, membranes, breathable films, sheets, or laminated films which can be utilized for house wrap, roofing materials, protective clothing, or items for personal comfort or hygiene products.

The monolithic sheets or films formed from polyurethane compositions of the present invention are advantageously suitable for use as protective clothing as they allow moisture vapor a passageway from one side of the film to the other. It is desirable to have garments that are to be worn in the rain or when participating in sports that keep the wearer dry by preventing the leakage of water into the garment, yet at the same time allow perspiration to evaporate from the wearer through the clothing to the atmosphere. The "breathable" TPU materials allow the perspiration to evaporate and in the one embodiment the polyurethane sheets of the present invention are apertureless and free or substantially free of punctures or porosity so as to prevent water from penetrating the garment. The polyurethane sheets and films are breathable and have a high affinity for water due to the built-in ethylene oxide units in their backbones from the mixed polyol component. This high affinity attracts water that is absorbed by the film. Subsequently, the water diffuses through the film, due to osmotic pressure, to the side of the film where the vapor pressure is lower. Thus, the sheets or films selectively allow water to pass there through, but do not allow bulk passage of water.

In one embodiment, the moisture vapor transmission (MVT) rate of a polyurethane film formed in accordance with the present invention, as measured by any accepted MVT test or standard, is at least about 5 percent higher than a similar TPU film formed from similar TPU reactants that do not utilize a mixed polyol component as described herein. In another embodiment, the increase in the moisture vapor transmission (MVT) rate of a polyurethane film formed is at least about 7.5 percent higher, or at least about 10 percent higher, or at least about 12.5 percent higher, or at least about 15 percent higher, or at least about 17.5 percent higher, or at least about 20 percent higher, or even at least about 22.5 percent higher than a similar TPU film formed from similar TPU reactants that do not utilize a mixed polyol component as described herein.

In still another embodiment, the increase in the moisture vapor transmission (MVT) rate of a polyurethane film formed is at least about 25 percent higher, or at least about 50 percent higher, or at least about 75 percent higher, or at least about 100 percent higher, or at least about 150 percent higher, or at least about 200 percent higher, or even at least about 250 percent higher than a similar TPU film formed from similar TPU reactants that do not utilize a mixed polyol component as described herein. In still yet another embodiment, the increase in the moisture vapor transmission (MVT) rate of a polyurethane film formed is at least about 300 percent higher, or at least about 400 percent higher, or at least about 500 percent higher, or at least about 750 percent higher, or even at least about 1,000 percent higher than a similar TPU film formed from similar TPU reactants that do not utilize a mixed polyol component as described herein. Here, as well as elsewhere in the specification and claims, individual range numbers can be combined to form various two-ended ranges.

Given the above, the actual MVT values of the TPUs of the present invention are not as important as the amount of increase in the MVT value of such TPUs when compared with a similar TPU formed from a set of reactants that do not include a mixed polyol component. However, in one embodiment, the moisture vapor transmission (MVT) rate of a 1 mil thick polyurethane film formed in accordance with the present invention, as measured by ASTM E96-BW (23° C.-50% relative humidity), is at least about 10,000, at least about 12,000, at least about 13,000, at least about 14,000, at least about 15,000, at least about 16,000, or even at least about 17,000. In another embodiment, the moisture vapor transmission (MVT) rate of a 1 mil thick polyurethane film formed in accordance with the present invention, as measured by JIS 1099 (23° C.-50% relative humidity), is at least about 3,200, at least about 3,300, at least about 3,400, at least about 3,500, at least about 3,600, or even at least about 3,700.

Previously, films which have been utilized in house wrap applications included breathable fabrics or polyolefin films which were perforated and porous in order to make them breathable. As stated above, sheets and films formed from the TPUs of the present invention are breathable even when unperforated. Sheets and films of the present invention can be formed in any desired thickness, and when used for house wrap, in garments, or similar applications, are from about 0.5 mil to about 10 mil, or from about 0.6 mil to about 4 mil, or even from about 1 mil to about 1.5 mil in thickness. The sheets and films of the present invention can optionally have a backing layer applied thereto. The backing layer can be any woven or non-woven substrate such as paper or cellulose product, or polymer backings such as polyethylene, polypropylene, nylon or polyester. Optionally, an adhesive can be utilized to adhere sheets or films of the present invention to a backing layer.

As stated above, the films of the present invention are flexible and have excellent physical properties especially against water leaks commonly found in present microporous films.

The present invention will be better understood with reference to the following examples which serve to illustrate the present invention. It should be noted that the present invention is not limited solely to the examples set forth below.

EXAMPLES

Tables 1 and 2 illustrate various polyurethane formulations including those formed in accordance with present invention.

The thermoplastic polyurethane polymers illustrated below are prepared by a random melt polymerization method. In this method, the mixed polyol component and the chain extender (e.g., 1,4-butanediol and/or trimethyolpropane) are mixed together at a temperature of about 143° C. to about 148° C. The mixed polyol component/chain extender combination is heated to a temperature of about 205° C. and then supplied to an extruder. Also supplied to the extruder for addition to the mixed polyol component/chain extender combination is a pre-heated polyisocyanate (e.g., MDI at 100° C.) and a pre-heated catalyst (e.g., DBTL or DOTDL at 49° C.). The extruder is a 30 mm twin intermeshing co-rotating screw extruder with temperature controls as listed in Table 3. Additional details regarding the conditions at which the reactants are supplied to the extruder are given in Table 4. The resulting TPUs are pelletized and tested for $T_g$ and $T_m$. The pellets are then extruded into a 5 mil film for Kofler $T_m$ testing and into a 1 mil film for MVT testing (as determined by ASTM E96-BW (23° C.-50% relative humidity) or JIS 1099 (23° C.-50% relative humidity)). The results of these various tests are reported in Tables 1 and 2.

TABLE 1

| Example | Comparative 1 | 1 | 2 |
|---|---|---|---|
| PEG 1000 (g) | 163.5 | 155.325 | 147.15 |
| Poly (EO-co-PO) (Poly G 55-112) (g) | 0 | 8.175 | 16.35 |
| 1,4-BDO (g) | 36.5 | 36.5 | 36.5 |
| MDI (g) | 141.4 | 141.4 | 141.4 |
| Irganox 245 (g) | 1.54 | 1.54 | 1.54 |
| DBTL (ppm) | 75 | 75 | 75 |
| PEG 1000 MW | 1000 | 1000 | 1000 |
| Poly G MW | 1000 | 1000 | 1000 |
| 1,4-BDO MW | 90 | 90 | 90 |
| MDI MW | 250.4 | 250.4 | 250.4 |
| Urethane Segment (%) | 52 | 52 | 52 |
| CE/Polyol Ratio | 2.48 | 2.48 | 2.48 |
| Stoichiometry (%) | 100 | 100 | 100 |
| MVT (JIS 1099) | 3160 | 3520 | 3760 |
| $T_m$ by DSC (° C.) | 161 | 160 | 161 |
| $T_g$ by DSC (° C.) | 7 | 7 | 9 |
| Kofler $T_m$ (° C.) | 148 | 147 | 150 |

TABLE 2

| Example | Comparative 2 | 3 | 4 |
|---|---|---|---|
| PEG 1450 (g) | 178.0 | 171.0 | 163.125 |
| Poly (EO-co-PO) (Poly G 55-NTP) (g) | 0 | 9.0 | 18.125 |
| 1,4-BDO (g) | 21.2 | 20.0 | 18.75 |
| TMP (g) | 0.18 | 0 | 0 |
| MDI (g) | 91.9 | 88.9 | 85.9 |
| Irganox 245 (g) | 1.045 | 1.0523 | 1.055 |
| DOTDL (g) | 0.015 | 0.015 | 0.015 |
| Talc (g) | 2.9 | 2.9 | 2.9 |
| Acrawax C (g) | 0.3 | 0.3 | 0.3 |
| PEG 1450 MW | 1450 | 1450 | 1450 |
| Poly G MW | 1300 | 1300 | 1300 |
| 1,4-BDO MW | 90 | 90 | 90 |
| MDI MW | 250.4 | 250.4 | 250.4 |
| Urethane Segment (%) | 39 | 39 | 39 |
| CE/Polyol Ratio | 1.92 | 1.78 | 1.65 |
| Stoichiometry (%) | 102.25 | 102.25 | 102.5 |
| MVT (ASTM E96-BW) | 14000 | 15000 | 17000 |
| $T_g$ by DSC (° C.) | −19 | −20 | −22 |
| Kofler $T_m$ (° C.) | 120 | 115 | 110 |

TABLE 3

Extruder Process Variable Set Points and Conditions

| Parameter | Value |
|---|---|
| Zone 1 Temperature | 195° C. |
| Zone 2 Temperature | 220° C. |
| Zone 3 Temperature | 230° C. |
| Zone 4 Temperature | 220° C. |
| Zone 5 Temperature | 210° C. |
| Zone 6 Temperature | 190° C. |
| Zone 7 Temperature | 190° C. |
| Zone 8 Temperature | 190° C. |
| Zone 9 Temperature | 190° C. |
| Zone 10 Temperature | 190° C. |
| Zone 11 Temperature | 190° C. |
| Zone 12 Temperature | N/A |
| Zone 13 Temperature | 205° C. |
| Zone 14 Temperature | 215° C. |
| Extruder Speed | 100 rpm |
| Suction Pressure | 150 psig |
| Die Melt Temperature | 180 to 196° C. |
| Die Pressure | 251 to 482 psig |
| Torque | 55 to 65 % |
| Water Bath Temperature | 4.45° C. |

TABLE 4

Feed System Process Variables and Conditions

| Parameter | Value |
|---|---|
| Polyol Flow[1] | 127.1 g/min |
| Polyisocyanate Flow[1] | 109.5 g/min |
| Chain Extender Flow[1] | 28.0 g/min |
| Catalyst Flow | 0.02 g/min |
| Side Feeder Flow | 0.175 g/min |
| Polyol Temperature | 190° C. |
| Polyisocyanate Temperature | 100° C. |
| Chain Extender Temperature | 110° C. |
| Polyol/Chain Extender Mix Temperature | 143 to 148° C. |

[1]At a stoichiometry of 100%

As discussed above, the thermoplastic polyurethane compositions of the present invention can be used to form any suitable article. Exemplary articles include a house wrap, part of a garment, or a roofing material, where, for example, a substrate layer and a breathable polyurethane layer formed from a thermoplastic polyurethane composition of the present invention are connected by an adhesive or directly connected to each other. In one embodiment, the substrate layer can be any suitable layer. Suitable substrate layers include, but are not limited to, woven or non-woven materials such as woven polyester or nylon, or non-woven polyester or polypropylene. As noted above, the breathable polyurethane layer can be from about 0.5 mil to about 10 mil thick.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

What is claimed is:

1. A thermoplastic polyurethane composition consisting essentially of:
   the reaction product of:
   (a) a mixed polyol component, the mixed polyol component comprising at least one poly(ethylene oxide) polyol having a number average molecular weight of from 500 to 3,300 Daltons and at least one copolymer polyol having a number average molecular weight of from 500 to 3,300 Daltons;
   (b) at least one polyisocyanate wherein the at least one polyisocyanate is selected from diphenylmethane-4,4' diisocyanate and methylene bis (4-cyclohexylisocyanate);
   (c) at least one chain extender, wherein the at least one chain extender is selected from ethanediol, propane glycol, 1,6-hexanediol, 1,3-butanediol, 1,5-pentanediol, neopentylglycol, 1,4-butanediol, diethylene glycol, dipropylene glycol, 1,2-cyclopentanediol, 1,4-cyclohexanedimethanol, hydroquinone di(B-hydroxyethyl) ether, 1,4-benzenedimethanol, and mixtures of two or more thereof; and
   (d) optionally at least one catalyst,
   wherein the mixed polyol component comprises from 3 weight percent to 10 weight percent of said copolymer polyol and from 90 to 97 weight percent of said poly (ethylene oxide) polyol, and wherein said copolymer is a copolymer of ethylene oxide and propylene oxide; and wherein the molar ratio of isocyanate functional groups to total hydroxyl groups of the mixed polyol component and chain extender is from 0.98 to 1.05.

2. The thermoplastic polyurethane of claim 1, wherein the overall number average molecular weight of the one or more copolymer polyols of the mixed polyol component of the present invention is in the range of from about 750 to about 3,300 Daltons.

3. The thermoplastic polyurethane of claim 1, wherein the overall number average molecular weight of the one or more poly(ethylene oxide) polyols of the mixed polyol component of the present invention is in the range of from about 750 to about 3,300 Daltons.

4. The thermoplastic polyurethane of claim 1, wherein the at least one copolymer polyol contains at least about 50 percent primary OH end groups.

5. The thermoplastic polyurethane of claim 1, wherein the at least one copolymer polyol contains at least about 60 percent primary OH end groups.

6. The thermoplastic polyurethane of claim 1, wherein the at least one catalyst, if present, is selected from one or more organic tin compounds, one or more organic titanium compounds, one or more tertiary amines, titanic acid, or mixtures of two or more thereof.

7. The thermoplastic polyurethane of claim 6, wherein the at least one catalyst is selected from dibutyltin diacetate, dibutyltin dilaurate, dioctyltin dilaurate, dibutyltin bis (ethoxybutyl 3-mercaptopropionate), or mixtures of two or more thereof.

* * * * *